United States Patent [19]

Artz

[11] Patent Number: 4,863,187

[45] Date of Patent: Sep. 5, 1989

[54] CAMBER ADJUSTMENT DEVICE WITH FINITE CAMBER ADJUSTMENT SETTINGS

[76] Inventor: William P. Artz, HC 30, Box 898, Prescott, Ariz. 86301

[21] Appl. No.: 174,084

[22] Filed: Mar. 28, 1988

[51] Int. Cl.$^4$ .................................................. B62D 17/00
[52] U.S. Cl. .................................... 280/661; 280/688
[58] Field of Search .............. 280/661, 673, 663, 668; 403/408, 409, 13, 14, 103, DIG. 8, 360, 367; 81/484

[56] References Cited

U.S. PATENT DOCUMENTS

| | | |
|---|---|---|
| 1,943,721 | 1/1934 | Carpenter . |
| 2,198,544 | 4/1940 | Leighton ............................ 280/661 |
| 2,990,901 | 7/1961 | Chayne . |
| 3,163,441 | 12/1964 | Traugott ............................ 280/661 |
| 3,917,308 | 11/1975 | Schulz ................................ 280/661 |
| 4,194,760 | 3/1980 | Shiomi et al. ..................... 280/668 |
| 4,313,617 | 2/1982 | Muramatsu ........................ 280/661 |
| 4,418,938 | 12/1983 | Sullivan et al. ................... 280/661 |
| 4,420,170 | 12/1983 | Wysocki ............................ 280/661 |
| 4,424,984 | 1/1984 | Shiratoru et al. ................. 280/661 |
| 4,462,241 | 7/1984 | Whisenant ......................... 280/661 |
| 4,462,609 | 7/1984 | Ohe ................................... 280/690 |
| 4,493,493 | 1/1985 | Satchell et al. ................... 280/661 |
| 4,580,807 | 4/1986 | Cox et al. .......................... 280/661 |
| 4,614,359 | 9/1986 | Lundin et al. ..................... 280/661 |
| 4,616,845 | 10/1986 | Pettibone ........................... 280/661 |
| 4,618,162 | 10/1986 | Specktor et al. .................. 280/661 |
| 4,650,208 | 3/1987 | Mason ................................ 280/661 |
| 4,706,987 | 11/1987 | Pettibone et al. ................. 280/661 |
| 4,718,691 | 1/1988 | Speckton et al. .................. 280/661 |
| 4,733,884 | 3/1988 | Pettibone et al. ................. 280/661 |
| 4,736,964 | 4/1988 | Specktor ............................ 280/661 |

OTHER PUBLICATIONS

Shim-A-Line Inc. 1986, Wheel Alignment Catalogue (address 3520 Belt Line Blvd., Minneapolis, Minn. 55416).

*Motor Auto Repair Manual*, 42nd Edition (1979) by Motor, 1790 Broadway—8th Floor, New York, N.Y. 10019, pp. 1-232, 1-233—see 1974-1979 Corvette Rear Wheel Alignment and FIG. 3.

Page 7 of 1987 Catalogue of Shim-A-Line, Inc., 3520 Belt Line Blvd., Minneapolis, Minn. 55416.

*Primary Examiner*—Charles A. Marmor
*Assistant Examiner*—Karin Tyson
*Attorney, Agent, or Firm*—William P. O'Meara

[57] ABSTRACT

A camber adjustment assembly which provides a plurality of discrete wheel camber adjustment positions through relative pivoting of a wheel assembly ball joint within a pair of strut flanges. In one embodiment, camber is selected through repositioning a multifaced cam plate. In another embodiment, camber is selected through use of a selected one of a plurality of interchangable bolt restraining plates.

5 Claims, 4 Drawing Sheets

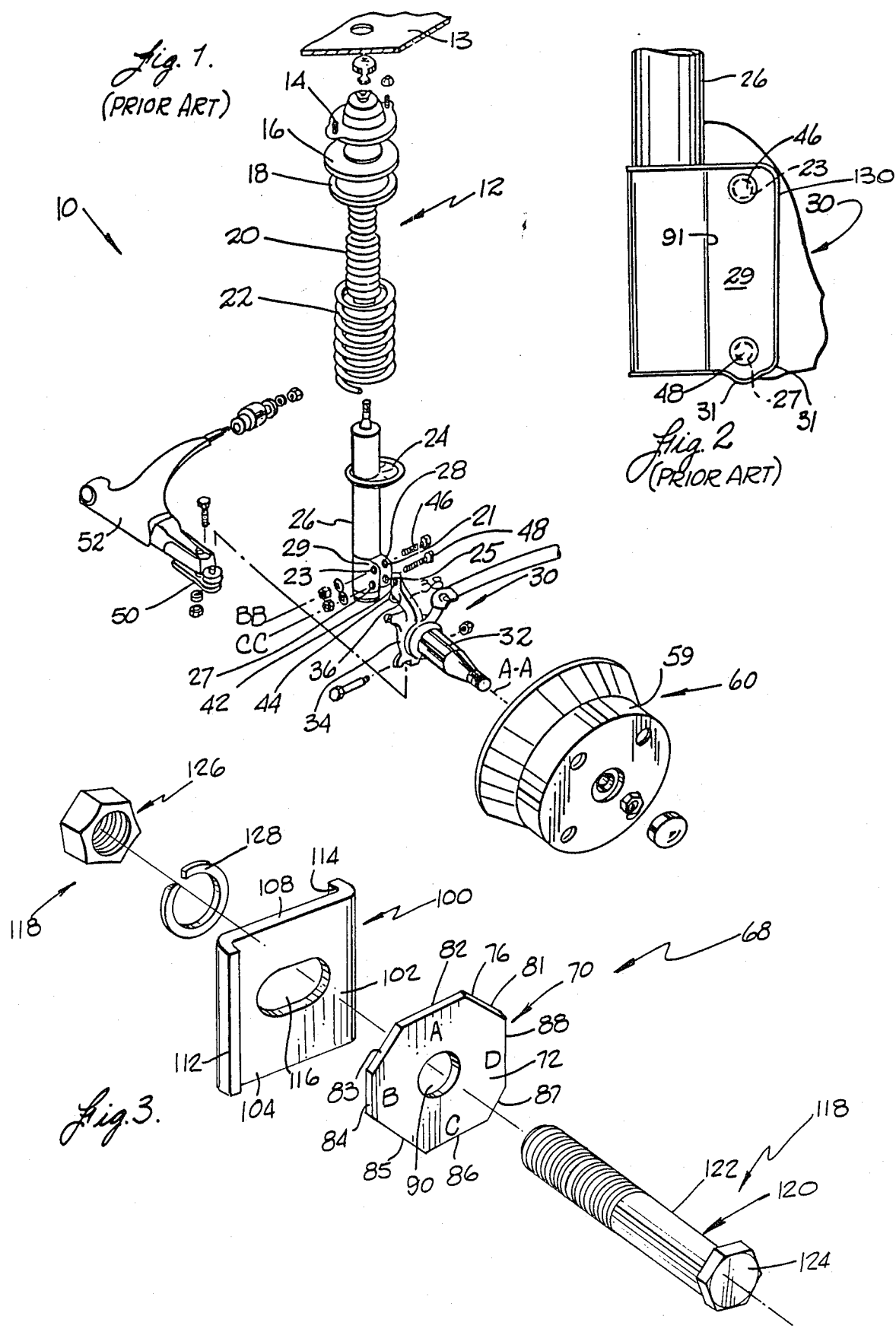

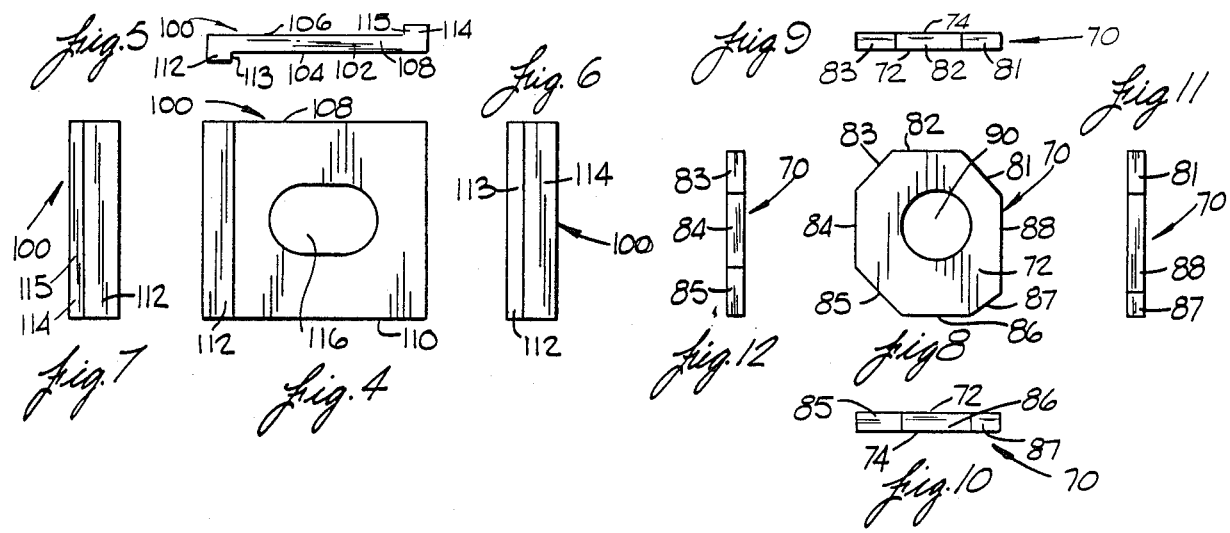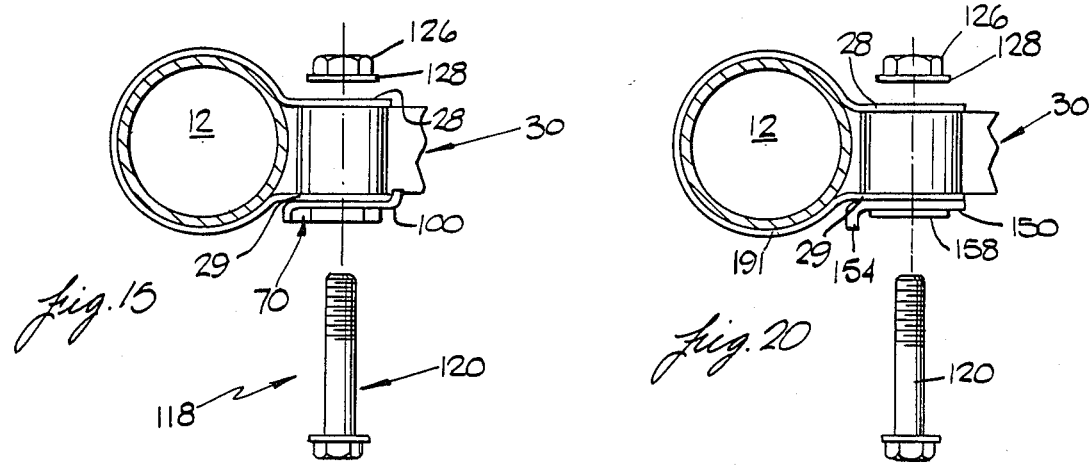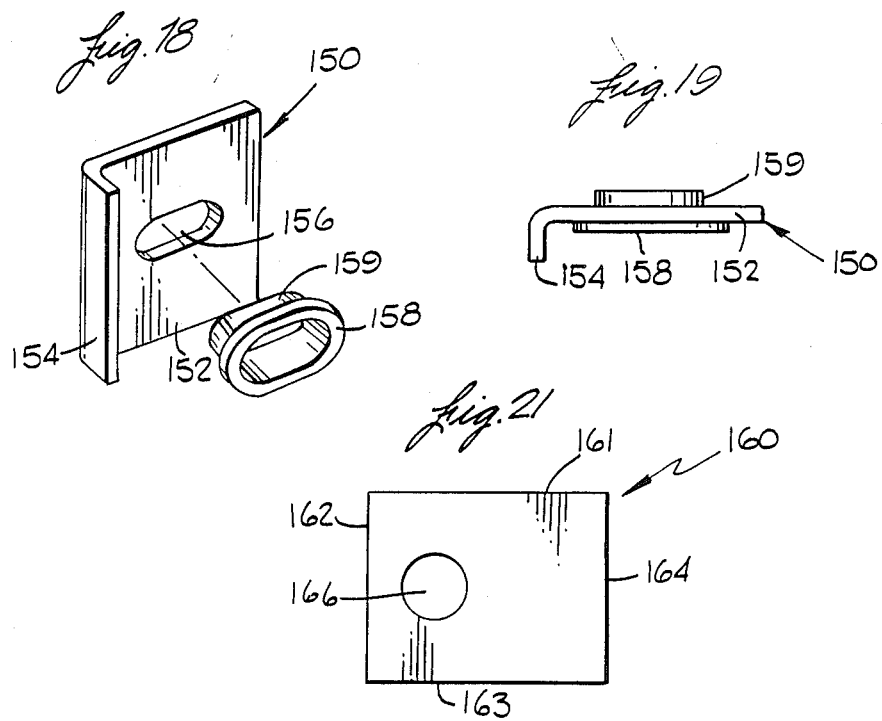

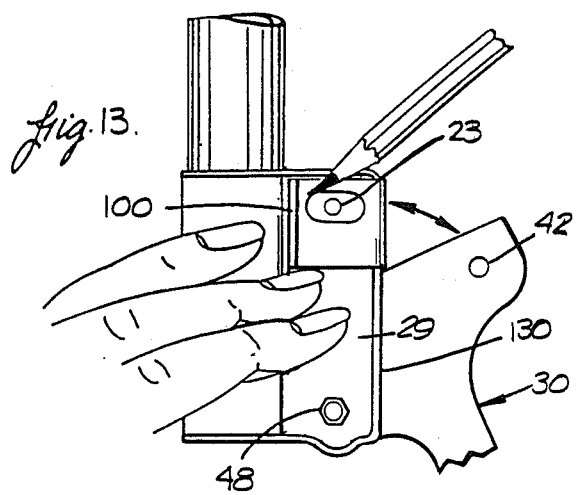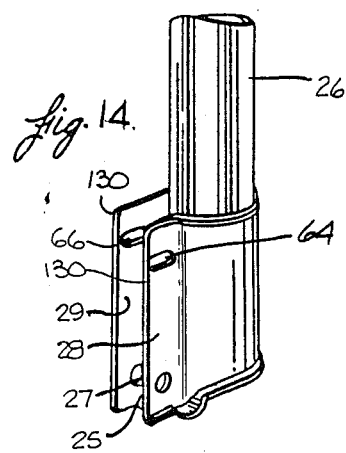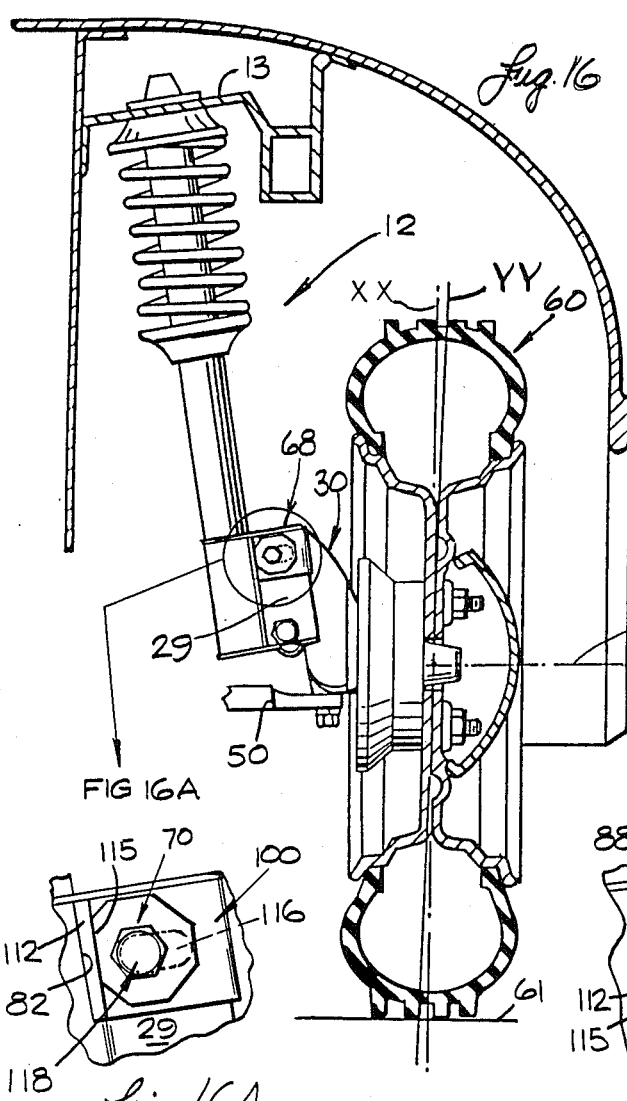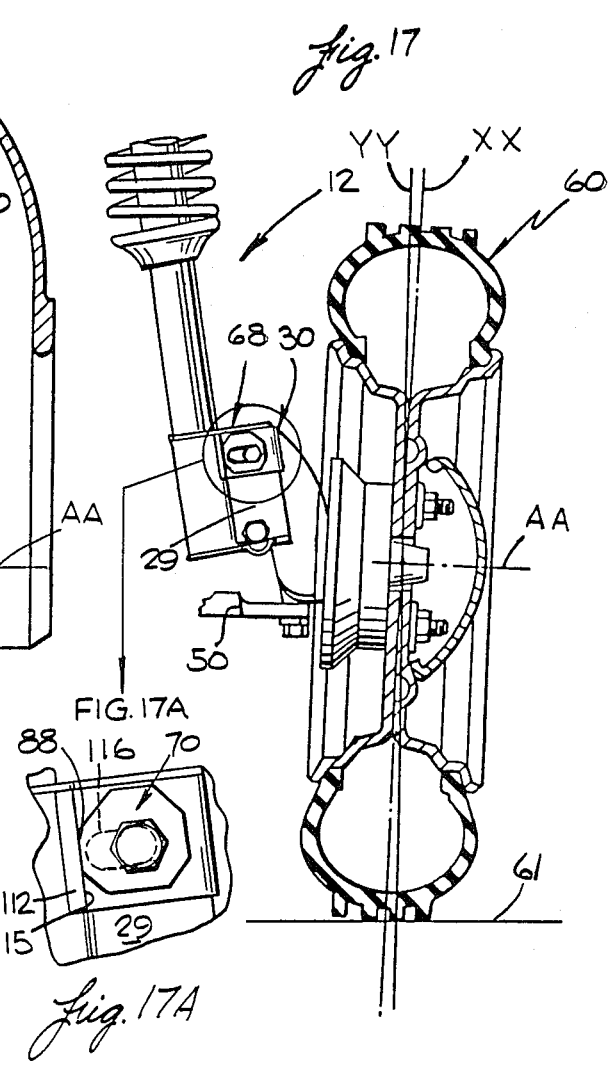

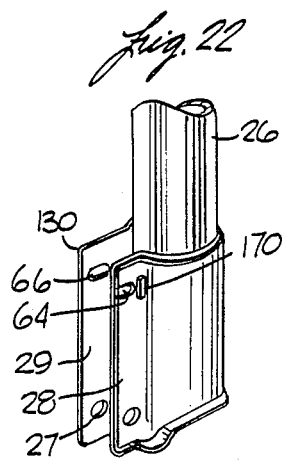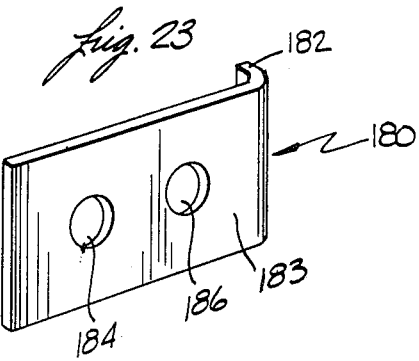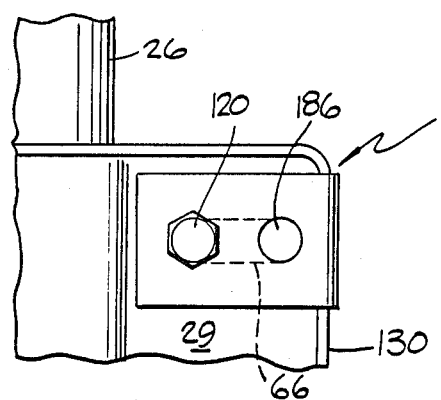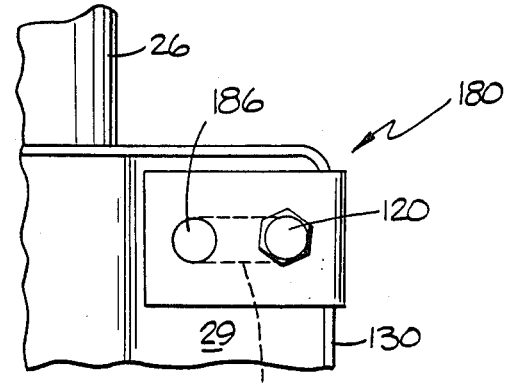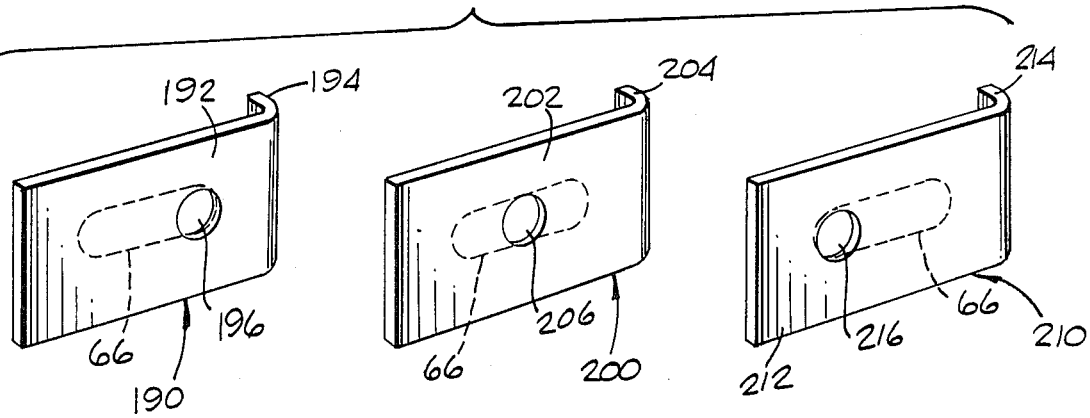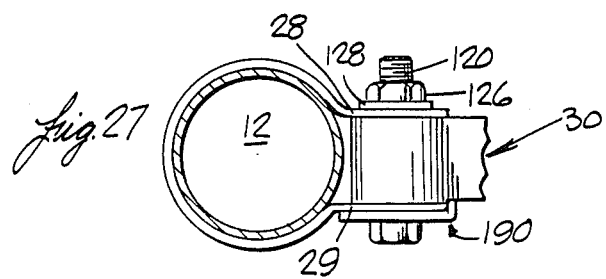

CAMBER ADJUSTMENT DEVICE WITH FINITE CAMBER ADJUSTMENT SETTINGS

BACKGROUND OF THE INVENTION

The present invention relates generally to automotive products and, more particularly, to an apparatus for adjusting the camber in the steerable front wheels of a vehicle having an independent front wheel suspension system.

In a conventional independent front wheel suspension system for an automotive vehicle, each wheel is mounted independently of the other. Each wheel is rotatably mounted on a wheel spindle which is fixedly bolted to an integrally formed ball joint and wheel knuckle assembly. The wheel knuckle portion of this assembly is in turn bolted to the lower end of an elongate, generally vertically extending shock strut. The upper end of the shock strut is attached to a body side panel, typically by a rubber insulated top mount assembly with attachment bolts. Due to the length and resiliency of the shock strut, the spindle and attached wheel are, to a small degree, displaceable in a direction perpendicular to the longitudinal axis of the shock strut and are also torsionally (twistably) displaceable about this axis if otherwise unrestrained. In order to restrain this movement and hold the wheel in a fixed orientation with respect to the vehicle steering assembly, a longitudinally extending restraining member, generally referred to as a tie rod, and a laterally extending restraining member, generally referred to as a control arm, is affixed at one end to the ball joint and wheel knuckle assembly and at an opposite end to the vehicle steering assembly. Due to manufacturing tolerances, etc. in the front wheel assemblies, the "camber" of a wheel in some cases needs adjustment. The "camber" of a wheel refers to the relative angle which the central plane of the wheel makes with a vertical axis extending perpendicular to the surface on which the vehicle is supported. Ordinarily the wheel knuckle in such a front wheel suspension system is fixedly bolted to a pair of laterally extending flanges affixed to a lower end of the strut assembly. In such an arrangement, camber adjustment can only be effected by using the relative "slop" provided between the bolt assembly and the associated bolt holes in the strut flanges and wheel knuckle. However, this "slop" provides very little camber adjustment. In one prior art cam adjustment assembly, an elliptical cam bolt assembly which engages factory-installed bosses on a strut flange is used to provide camber adjustment. However, most vehicles having the above described type of front wheel suspension system are not provided with such a cam adjustment assembly. It would be generally desirable to provide a cam adjustment assembly which could be easily retrofit on existing vehicles. However, providing bosses on a strut flange of the appropriate strength and tolerances for use with a cam bolt assembly is a very exacting and time-consuming operation which is beyond the skill of most automotive mechanics. Thus, until recently, there existed no convenient means for retrofitting a front wheel cam adjustment assembly on a vehicle having a front wheel suspension system of the type described above. Apparatus recently introduced for retrofitting a front wheel suspension system with a cam adjustment assembly is described in U.S. Pat. No. 4,706,987 issued Nov. 17, 1987, entitled CAMBER ADJUSTMENT DEVICE, of Craig R. Pettibone and Jimmy D. Berry; and in U.S. patent application Ser. No. 065,725 filed July 2, 1987, U.S. Pat. No. 4,733,884 entitled CAMBER ADJUSTMENT DEVICE, of Craig R. Pettibone and Jimmy D. Berry; both of which are hereby specifically incorporated by reference for all that is disclosed therein.

U.S. Pat. No. 4,706,987 discloses: a camber adjustment assembly for adjusting the camber of a wheel in a vehicle suspension system of the type ordinarily including a generally vertically extending strut assembly having an upper end attached to a vehicle frame assembly and having a pair of strut flanges positioned in parallel relationship with one another and projecting laterally outwardly from a lower end portion of the strut assembly; a wheel knuckle assembly mounted on the strut assembly and having a mounting portion positioned between the two strut flanges with a first hole therein adapted to closely, axially slidingly receive a first bolt therein which also passes through a first pair of coaxially aligned holes in the strut flanges in close axially sliding relationship and with a second hole therein adapted to closely, axially slidingly receive a second bolt which also passes through a second pair of coaxially aligned holes in the strut flanges in close axially sliding relationship, the first and second holes in the wheel knuckle mounting portion being vertically spaced apart, the first and second bolt holes in the wheel knuckle mounting portion and the first and second pair of holes in the strut flanges having axes positioned in substantially perpendicular relationship with the axis of rotation of a wheel supported on the wheel knuckle assembly, the camber adjustment assembly comprising: (a) parallel laterally extending slots provided in the pair of strut flanges by lateral extension of the first pair of holes therein; (b) a cam bolt assembly including a bolt and a cylindrical disc fixedly, eccentrically mounted at one end of the bolt, the cam bolt assembly having a central longitudinal axis for providing adjustable pivotal movement of the wheel knuckle about the axis of the second hole in the wheel knuckle mounting portion, the cam bolt being received in the parallel slots in the strut flanges and in the first hole in the wheel knuckle with the central longitudinal axis thereof positioned coaxially with the axis of the first hole in the wheel knuckle assembly and being adjustably laterally movable in the parallel slot in a first relatively loosened state of the cam bolt and being relatively fixed with respect to the parallel slot in a second relatively tightened state of the cam bolt; (c) a plate mounted on at least one of the strut flanges and adapted to coact with the strut flange and the cam bolt assembly for causing relative lateral displacement of the cam bolt assembly in the strut flange parallel slots during rotational movement of the cam bolt assembly about the cam bolt assembly central longitudinal axis in the first relatively loosened state; (d) whereby the camber of a wheel mounted on the wheel knuckle assembly is adjustable through rotation of the cam bolt assembly about the cam bolt assembly central longitudinal axis.

Patent application Ser. No. 065,725, U.S. Pat. No. 4,733,884 of Pettibone et al. discloses an insert member with an axially extending flange portion which is inserted into a plate to hold it in fixed relationship with an associated strut flange.

SUMMARY OF THE INVENTION

The present invention is directed to a camber adjustment assembly which may be retrofit on an existing vehicle suspension system or which may be provided as a factory-installed camber adjustment system. The camber adjustment assembly of the present invention provides a plurality of discrete camber adjustment positions which may be selected, in one embodiment, through rotational repositioning of a multifaced cam plate and, in another embodiment, through selection of one of a plurality of interchangable bolt restraining plates.

In one embodiment, the invention comprises a camber adjustment assembly for adjusting the camber of a wheel in a vehicle suspension system of the type ordinarily including a generally vertically extending strut assembly having an upper end attached to a vehicle frame assembly and having a pair of strut flanges positioned in parallel relationship with one another and projecting laterally outwardly from a lower end portion of the strut assembly; a wheel knuckle assembly mounted on the strut assembly and having a mounting portion positioned between the two strut flanges with a first hole therein adapted to closely, axially slidingly receive a first bolt therein which also passes through a first pair of coaxially aligned holes in the strut flanges in close axially sliding relationship and with a second hole therein adapted to closely, axially slidingly receive a second bolt which also passes through a second pair of coaxially aligned holes in the strut flanges in close axially sliding relationship, the first and second holes in the wheel knuckle mounting portion being vertically spaced apart, the first and second bolt holes in the wheel knuckle mounting portion and the first and second pair of holes in the strut flanges having axes positioned in substantially perpendicular relationship with the axis of rotation of a wheel supported on the wheel knuckle assembly, the camber adjustment assembly comprising: (a) parallel laterally extending slot means provided in said pair of strut flanges by lateral extension of said first pair of holes therein; (b) bolt means having a central longitudinal axis for providing adjustable pivotal movement of said wheel knuckle about said axis of said second hole in said wheel knuckle mounting portion, said bolt means being laterally displaceable received in said parallel slot means in said strut flanges and being received in said first hole in said wheel knuckle with said central longitudinal axis thereof positioned substantially coaxially with said axis of said first hole in said wheel knuckle assembly; (c) cam plate means for stably holding said bolt means in a plurality of discrete, relatively laterally shifted positions within said slot means; a different wheel camber position being provided by each of said discrete, relatively laterally shifted positions of said bolt means; said cam plate means comprising a discrete peripheral surface portion associated with each of said plurality of different wheel camber positions; said cam plate means being mounted in radially nondisplaceable relationship relative said bolt means central longitudinal axis; (d) cam engaging means stationarily mounted on one of said strut flanges for selectively engaging different ones of said discrete peripheral surface portions of said cam plate means for preventing slipping rotation of said cam plate means about said bolt means central longitudinal axis and for holding said cam plate means at a fixed lateral location relative said slot means, which is associated with the selected one of said cam means peripheral surface portions.

In another embodiment, the invention comprises a camber adjustment assembly for adjusting the camber of a wheel in a vehicle suspension system of the type ordinarily including a generally vertically extending strut assembly having an upper end attached to a vehicle frame assembly and having a pair of strut flanges positioned in parallel relationship with one another and projecting laterally outwardly from a lower end portion of the strut assembly; a wheel knuckle assembly mounted on the strut assembly and having a mounting portion positioned between the two strut flanges with a first hole therein adapted to closely, axially slidingly receive a first bolt therein which also passes through a first pair of coaxially aligned holes in the strut flanges in close axially sliding relationship and with a second hole therein adapted to closely, axially slidingly receive a second bolt which also passes through a second pair of coaxially aligned holes in the strut flanges in close axially sliding relationship, the first and second holes in the wheel knuckle mounting portion being vertically spaced apart, the first and second bolt holes in the wheel knuckle mounting portion and the first and second pair of holes in the strut flanges having axes positioned in substantially perpendicular relationship with the axis of rotation of a wheel supported on the wheel knuckle assembly, the camber adjustment assembly comprising: (a) parallel laterally extending slot means provided in said pair of strut flanges by lateral extension of said first pair of holes therein; (b) bolt means having a central longitudinal axis for providing adjustable pivotal movement of said wheel knuckle about said axis of said second hole in said wheel knuckle mounting portion, said bolt means being laterally displaceable received in said parallel slot means in said strut flanges and being received in said first hole in said wheel knuckle with said central longitudinal axis thereof positioned substantially coaxially with said axis of said first hole in said wheel knuckle assembly; (c) plate means for stably holding said bolt means in a plurality of discrete, relatively laterally shifted positions within said slot means; a different wheel camber position being provided by each of said discrete, relatively laterally shifted positions of said bolt means.

In another embodiment, the invention comprises a camber adjustable, vehicle wheel suspension system comprising: a generally vertically extending strut assembly having an upper end attached to a vehicle frame assembly and having a pair of strut flanges positioned in parallel relationship with one another and projecting laterally outwardly from a lower end portion of the strut assembly; a wheel knuckle assembly mounted on the strut assembly and having a mounting portion positioned between the two strut flanges with a first bolt hole therein adapted to closely, axially slidingly receive a first bolt therein which is also laterally displaceably received in a pair of oppositely positioned, laterally extending slots in the two strut flanges and with a second bolt hole therein adapted to closely, axially slidingly receive a second bolt which also passes through a pair of coaxially aligned bolt holes in the strut flanges, the first and second holes in the wheel knuckle mounting portion being vertically spaced apart, the first and second bolt holes in the wheel knuckle mounting portion and the pair of slots and pair of holes in the strut flanges having axes positioned in transverse relationship with the axis of rotation of a wheel supported on the wheel knuckle assembly; cam plate means for stably holding said first bolt in a plurality of discrete, relatively laterally shifted positions within said slots; a different wheel camber position being provided by each of said discrete, relatively laterally shifted positions of said first bolt; said cam plate means comprising a discrete peripheral surface portion associated with each of said plurality of different wheel camber positions; said cam plate means being mounted in radially nondisplaceable relationship relative said first bolt central longitudinal axis; cam engaging means stationarily mounted on one of said strut flanges for selectively engaging different ones of said discrete peripheral surface portions of said cam plate means for preventing slipping rotation of said cam plate means about said first bolt central longitudinal axis and for holding said cam plate means at a fixed lateral location relative said strut flange slots, which is associated with the selected one of said cam means peripheral surface portions engaged by cam engaging means.

In another embodiment, the invention comprises a camber adjustable, vehicle wheel suspension system comprising: a generally vertically extending strut assembly having an upper end attached to a vehicle frame assembly and having a pair of strut flanges positioned in parallel relationship with one another and projecting laterally outwardly from a lower end portion of the strut assembly; a wheel knuckle assembly mounted on the strut assembly and having a mounting portion positioned between the two strut flanges with a first bolt hole therein adapted to closely, axially slidingly receive a first bolt therein which is also laterally displaceably received in a pair of oppositely positioned, laterally extending slots in the two strut flanges and with a second bolt hole therein adapted to closely, axially slidingly receive a second bolt which also passes through a pair of coaxially aligned bolt holes in the strut flanges, the first and second holes in the wheel knuckle mounting portion being vertically spaced apart, the first and second bolt holes in the wheel knuckle mounting portion and the pair of slots and pair of holes in the strut flanges having axes positioned in transverse relationship with the axis of rotation of a wheel supported on the wheel knuckle assembly; cam plate means for stably holding said first bolt in a plurality of discrete, relatively laterally shifted positions within said strut flange; a different wheel camber position being provided by each of said discrete, relatively laterally shifted positions of said first bolt.

BRIEF DESCRIPTION OF THE DRAWING

FIG. 1 is an exploded perspective view of a prior art front wheel suspension system.

FIG. 2 is a detailed side elevation view of a strut flange and wheel knuckle portion of the front wheel suspension system of FIG. 1.

FIG. 3 is an exploded perspective view of a cam plate, reaction plate, and bolt assembly.

FIG. 4 is a front elevation view of a reaction plate.

FIG. 5 is a top view of the reaction plate of FIG. 4.

FIG. 6 is a right-side elevation view of the reaction plate of FIG. 4.

FIG. 7 is a left-side elevation view of the reaction plate of FIG. 4.

FIG. 8 is a front elevation view of a cam plate.

FIG. 9 is a top view of the cam plate of FIG. 8.

FIG. 10 is a bottom view of the cam plate of FIG. 8.

FIG. 11 is a right-side elevation view of the cam plate of FIG. 8.

FIG. 12 is a left-side elevation view of the cam plate of FIG. 8.

FIG. 13 is a side elevation view illustrating the modification of the strut flange of FIG. 2.

FIG. 14 is a perspective view illustrating a pair of modified strut flanges.

FIG. 15 is a cross sectional elevation view illustrating mounting of the cam plate, reaction plate, and bolt assembly of FIG. 3 on the modified strut flanges of FIG. 14.

FIG. 16 is a partially cut-away elevation view illustrating one camber adjustment position provided by the cam plate, reaction plate, and bolt assembly of FIG. 3.

FIG. 16A is a detail view of FIG. 16 illustrating the relative position of the cam plate, reaction plate, and bolt assembly with respect to an associated strut flange slot.

FIG. 17 is a partially cut-away elevation view illustrating another camber adjustment position provided by the cam plate, reaction plate, and bolt assembly of FIG. 3.

FIG. 17A is a detail view of FIG. 17 illustrating the relative position of the cam plate, reaction plate, and bolt assembly with respect to an associated strut flange slot.

FIG. 18 is a perspective view of another embodiment of a reaction plate provided with a stabilizing insert.

FIG. 19 is a top view of the reaction plate and insert of FIG. 18.

FIG. 20 is a cross sectional elevation view illustrating mounting of the cam plate, reaction plate, and bolt assembly of FIG. 3, except with the reaction plate assembly of FIG. 18 substituted for the reaction plate of FIG. 3.

FIG. 21 is a front elevation view of another embodiment of a cam plate.

FIG. 22 is a perspective view illustrating a pair of strut flanges having a pair of slots therein and having a boss portion provided on one of the strut flanges.

FIG. 23 is a perspective view of a bolt restraining plate having a plurality of bolt receiving holes therein.

FIGS. 24 and 25 are front elevation views illustrating the use of the bolt restraining plate of FIG. 23 to provide two different camber positions.

FIG. 26 is a perspective view of a plurality of bolt receiving plates each having a bolt receiving hole therein at a different relative lateral position within the plate.

FIG. 27 is a cross sectional elevation view illustrating mounting of one of the bolt receiving plates of FIG. 26 on the modified strut flanges of FIG. 14.

DETAILED DESCRIPTION OF THE INVENTION

The camber adjustment assembly 68 of the present invention is adapted for adjusting the camber of a wheel assembly 60 of a prior art vehicle wheel suspension system of the type illustrated in FIGS. 1 and 2. Such a suspension system in general comprises a generally vertically extending strut assembly 12 having an upper end attached to a vehicle frame and body assembly 13. The strut assembly has a pair of strut flanges 28, 29 positioned in parallel relationship with one another which project laterally outwardly from the lower end of the strut assembly. The suspension systems also comprises a ball joint assembly 30 having a wheel knuckle portion 36 mounted on the strut assembly. The wheel knuckle 36 is positioned between the two strut flanges 28, 29 with a first, upper hole 42 therein adapted to closely, axially slidingly receive a first bolt 46. Bolt 46 also passes through a first pair of coaxially aligned bolt holes 21, 23 in upper portions of the strut flanges. A second, lower hole 44 in the knuckle portion 36 is adapted to closely, axially slidingly receive a second bolt 48. Bolt 48 also passes through a second pair of coaxially aligned holes 25, 27 in lower portions of the strut flanges. In an assembled state, the first and second bolt holes 42, 44 in the wheel knuckle portion, and the first and second pairs of holes in the strut flanges define axes BB, CC which are positioned in substantially perpendicular relationship with the axis of rotation AA of a wheel assembly 60 which is supported on the ball joint assembly 30.

The camber adjustment assembly, in general, comprises parallel laterally extending slots 64, 66 provided in the pair of strut flanges 28, 29 by lateral extension of one of the coaxial pair of holes therein, e.g. 21, 23, FIGS. 13 and 14. As shown by FIG. 3, the camber adjustment assembly 68 further comprises a bolt assembly 118; a multi-side-faced cam plate 70 having a central bore 90 for receiving bolt assembly 118; and a reaction plate 100 having a slot 116 therein adapted to laterally displaceably receive bolt assembly 118, and having a cam plate engaging flange portion 112, and a strut flange engaging portion 114.

To adjust camber, initially the vehicle is elevated so that wheel assembly 60 is not in contact with the ground. Then bolt assembly 46, FIGS. 1 and 2, is removed and the nut on bolt assembly 48 is loosened enough to allow pivotal movement of ball joint 30 about bolt 48 axis CC. Next, as shown in FIG. 13, ball joint assembly 30 is pivoted out and away from flange upper holes 21, 23 (or is alternately entirely removed from between the flanges 28, 29) and reaction plate 100 is used as a template and a slot elongation pattern is drawn around each of holes 21, 23. Next, holes 21, 23 are extended laterally in both directions, e.g. 0.5 in. in each lateral direction, to provide slots 64, 66. Next, ball joint 30 is pivoted (or reinstalled) so as to bring hole 42 back into general alignment with strut flange slots 64, 66.

Next, as illustrated in FIGS. 15, 16, 16A, 17 and 17A, bolt assembly 118, which is used to replace original equipment bolt assembly 46, is installed, FIG. 1. Bolt assembly bolt 118 may be slightly longer, e.g. 0.5 in. longer, than bolt assembly 46, but is of the same diameter. Cam plate 70 and reaction plate 100 are mounted on bolt portion 120 of bolt assembly 118 and bolt 120 is then inserted through strut flange elongate slot 64, upper bolt hole 42 in ball joint assembly 30 and strut flange elongate slot 66. Original equipment bolt assembly 48 remains, in a loosened state, in its original location in lower strut flange holes 25, 27 and lower ball joint hole 44. Reaction plate flange portion 114 is positioned in engagement with a peripheral portion 130 of the associated strut flange 29 and prevents inward lateral movement of the reaction plate. Nut 126 and washer 128 of bolt assembly 118 are then loosely secured to bolt 120 in sufficiently tight relationship to hold reaction plate 100 in sufficiently close relationship with the strut flange 29 to maintain flange 114 in engagement position with strut flange periphery 130 and in sufficiently loose relationship to allow bolt 120 to move laterally within strut flange slots 64, 66 and reaction plate slot 116 in response to pivotal movement of ball joint assembly 30 about axis CC of lower bolt assembly 48. Next, a particular camber setting is selected by positioning a selected one, e.g. 82, FIG. 16A, of the multiple side faces of cam plate 70 opposite to cam engaging portion 112 of reaction plate 100. Cam plate 70 is provided with a plurality 81-88 of different peripheral faces. In the preferred embodiment illustrated in FIGS. 3 and 8-12, which is presently the best mode contemplated, faces 82, 84, 86, and 88 are the "operative" faces and are each positioned at a different preset distance from central bore 90 and thus each provide a different amount of camber adjustment which may be indicated by indicia such as letters A, B, C, D shown in FIG. 3. Alternately, letters A, B, C, D could be replaced by numbers indicative of the precise amount of camber change associated with each face, e.g. 0°, 0.5°, 1°, 1.5°. Next, the ball joint assembly is pivoted about axis CC to urge bolt assembly 118, cam plate 70 and reaction plate 100 as far inwardly (i.e. as far toward the left, in the illustration of FIGS. 16 and 17) as possible and nut 126 is torqued tightly on bolt 120.

During this entire process, original equipment bolt assembly 48 has remained in place in lower strut flange holes 25, 27 and lower ball joint hole 44 and acted as a pivot axis for ball joint assembly 30. Finally, the nut of bolt assembly 44 is firmly tightened and the camber adjustment process is complete.

Having thus described the invention in general, specific features of the invention and the vehicle wheel suspension system for which it is adapted will be described in further detail.

FIG. 1 illustrates a portion of a front wheel suspension system of the type which is presently in use on a number of newer vehicles. The wheel suspension system includes a strut assembly 12 which is attached at an upper end thereof to the vehicle frame and body assembly 13 as further illustrated in FIG. 16. The strut assembly may include a strut mount 14, an upper spring seat 16, a seal 18, a dust boot 20, a coil spring 22, a lower spring seat 24, a strut 26, and a pair of laterally projecting parallel strut flanges 28, 29 which are fixedly mounted on the strut. A wheel ball joint 30, which is adapted to rotatably support a hub portion 59 of a wheel assembly 60, comprises a spindle 32 having an axis AA defining the rotational axis of the wheel. The spindle is mounted on a ball joint member 34 which is integrally connected with a wheel knuckle portion 36 by arm portion 38. The wheel knuckle portion 36 has an upper horizontally extending hole 42 therein and a lower horizontally extending hole 44 therein, each having an axis BB, CC respectively, positioned perpendicular to the wheel axis AA. Horizontally extending bolt assemblies 46, 48 are adapted to attach the knuckle portion 36 to the strut flanges 28, 29, as illustrated in FIGS. 1 and 2. A steering knuckle assembly 50 associated with a lower control arm assembly 52 is adapted to be connected with a lower portion of the assembly 30.

As illustrated in FIG. 3, the camber adjustment assembly 68 comprises a cam plate 70, a reaction plate 100 and a bolt assembly 118. As shown in FIGS. 3 and 8-12, cam plate 70 has a flat front face surface 72, an identical flat back face surface 74, and a polygonal peripheral edge surface 76 which provides a plurality of separate planar side faces 81-88. A circular, bolt receiving hole 90 having a circumference adapted to receive bolt 120 of bolt assembly 118 in close slidingly relationship therethrough is positioned at a central portion of cam plate 70. In the embodiment illustrated in FIG. 3, cam plate assembly side face surfaces 82, 84, 86, and 88 are each located at a different predetermined spacing from the center of bore 90. Each of the faces 82, 84, 86, 88 is also preferably symmetrically located relative the central axis of bore 90, i.e. the terminal ends of any given side face surface are positioned the same radial distance from the center of bore 90. As shown in FIG. 3, each of the side face surfaces 82, 84, 86, 88 may have an indicia, e.g. A, B, C, D, respectively associated therewith, which is indicative of a camber setting. Specific information regarding the camber setting associated with each indicia may be provided on a printed sheet which is included with the product and which is calculated for different spacings between axes BB and CC and different strut flange widths of different vehicles. For example, setting A may provide a 0° camber adjustment, setting B may provide a 0.5° camber adjustment, setting C may provide a 1° camber adjustment, setting D may provide a 1.5° camber adjustment when used in association with a vehicle having a spacing between axes BB and CC of 3.0 in. and having a strut flange vertical edge 130 located 1.5 in. from the center of original strut flange hole 46. Cam plate 70 is preferably constructed from a high strength material such as, e.g., ⅛ in. steel plate or the like.

Reaction plate 100 may also be constructed from a high strength material such as ⅛ in. steel plate. As illustrated in FIGS. 3–7, reaction plate 100 comprises a main body portion 102 having a front surface 104 and a back surface 106 and having a top edge face surface 108 and a bottom edge face surface 110. On a fist lateral side of the main body portion 102, a cam plate engaging, forwardly projecting flange portion 112 is provided which has a generally planar cam plate engaging surface 113. The flange portion 112 may be provided through providing a right angle bend at an end portion of a flat metal plate. On a second lateral side of the main body portion 102 is provided a strut flange engaging, rearwardly projecting flange portion 114, having a generally planar strut flange edge engaging surface 115, which may be formed in the same manner as flange 112. A laterally extending slot 116, having a slot width slightly larger, e.g. 0.05 in., than the diameter of hole 23, which may be stamped from the metal plate, is provided at a central region of main body portion 102. Flange portion 114 is adapted to engage an outer peripheral edge portion 130, FIGS. 2, 13 and 14, of one of the strut flanges, e.g. strut flange 29. It will be appreciated that the strut flange outer periphery may comprise a different configuration than the generally rectangular configuration illustrated in FIGS. 2 and 14 and elsewhere herein, and that the shape of flange 114 may be adapted to conform to such other shapes of the strut flange outer periphery. The engagement of reaction plate flange portion 114 with the strut flange outer periphery 130 prevents the reaction plate from moving relatively inwardly in response to force exerted thereon by cam plate 70 which is in turn caused by the force exerted by bolt 120 upon cam plate 70. This force produced by bolt assembly 120 upon cam plate 70 is in turn produced by a torque which tends to cause spindle assembly 30 to pivot in a generally counterclockwise direction in the embodiment illustrated in FIGS. 16 and 17 (i.e. the upper portion of spindle assembly 30 is urged relatively inwardly due to the eccentric load exerted on the spindle assembly by the wheel assembly 60 due to its contact with base surface 61).

Flange portion 112 is adapted to abuttingly engage each of the planar side face portions 82, 84, 86, 88 of the cam plate 70. For this purpose, in the specific embodiment illustrated, cam plate 112 is illustrated to have a generally planar surface configuration 115. It will, of course, be appreciated that side faces 82, 84, 86, 88 could be provided in other than planar configurations, e.g. in a saw tooth configuration (not shown), and that flange portion 112 could be provided with a surface configuration adapted to matingly engage such alternative surface configurations of side faces 82, 84, 86, 88. The exact configuration of the cam plate faces 82, 84, 86, 88 and the associated engaging surface of flange 112 need only be such as to prevent any tendency of plate 70 to rotate subsequent to engagement with flange 112.

Bolt assembly 118, which may be, e.g., ½ in. longer than bolt assembly 46, comprises a bolt 120 having a threaded shaft portion 122 and a head portion 124. A nut 126 threadable onto shaft 122, as well as a lock washer 128 receivable about shaft 122, is provided as shown in FIG. 3.

The use of the camber adjustment assembly 68 to provide different wheel positions is illustrated in FIGS. 16, 16A, 17, and 17A. In the embodiment illustrated in FIGS. 16 and 16A, camber plate side face surface 82 is positioned in abutting engagement with an engaging surface portion of reaction plate flange 112. In the embodiment illustrated, surface 82 is depicted as the surface being closest to hole 90 and thus provides a camber wheel position in which the central planar axis XX of the wheel assembly is tilted relatively inwardly at the upper portion thereof with respect to a vertical axis YY and causing wheel axis AA to project outwardly and slightly upwardly. FIG. 17 illustrates the situation when cam plate face portion 88 is positioned in abutting engagement with the cam engaging surface portion 115 of flange 112. In this embodiment, face surface 88 is depicted to be the face surface which is radially most remote from central bore 90. Thus, the upper portion of ball joint assembly 30 is shifted relatively outwardly resulting in the wheel assembly central plane XX being tilted outwardly of vertical plane YY at the upper portion of wheel assembly 60 and causing wheel axis AA to project outwardly and slightly downwardly. Camber plate faces 84 and 86, when positioned in engagement with surface 115, provide intermediate camber positions of the wheel, between the two extremes shown in FIGS. 16 and 17. It would, of course, be possible to produce a camber plate having more than four camber adjustment positions or having less than four camber adjustment positions, and it would also be possible to provide cam plates 70 having relatively greater adjustments provided by the different peripheral faces, or relatively smaller adjustments provided by the different faces, simply through proper selection of the relative distance of the various peripheral faces from the center of bore 90. It will also be appreciated that a plurality of camber plates 70 having different configurations could be provided with any camber adjustment assembly 68 of the type shown in FIG. 3 to provide any desired number of camber adjustments for the assembly. It would also be possible to provide more than one reaction plate 100 with each of the different reaction plates having a flange 112 positioned at a relatively different distance laterally from plate slot 116 to provide additional camber adjustment positions.

Another embodiment of a reaction plate is illustrated in FIGS. 18–20. The reaction plate 150 of this embodiment comprises a main body portion 152 and a single, forwardly projecting cam plate engaging flange 154. A central slot 156 which is slightly larger than slot 116 in reaction plate 100 is provided to receive an insert 158 therethrough having an axially extending flange 159 which is adapted to engage the interior periphery of the elongate slot, e.g. 66, in the associated flange, e.g. 29. Flange 159, in this embodiment, prevents lateral displacement of reaction plate 150 relative slot 66. In a slightly different embodiment, cam plate 150 is not provided with insert 158 and is prevented from moving laterally by engagement of plate flange 154 with an outwardly projecting portion of strut encircling band 191 which is integrally formed with flange 29.

FIG. 21 illustrates another embodiment of a cam plate 160 having only four lateral sides 161, 162, 163, 164 which are each positioned at a different radial distance from bore 166.

FIG. 22 illustrates an embodiment of the invention in which a boss 170 extending transversely of slot 64 is provided on one strut flange, e.g. 28, and acts to engage the different faces of a cam plate 70 in the same manner as reaction plate flange portion 112. The boss portion may be provided as by a small block welded to the associated strut flange. This embodiment may be preferable as a "factory-installed" version of the invention in which slots 64, 66, as well as boss portion 170, are provided as original equipment.

Another embodiment of the invention is illustrated in FIG. 23 in which cam plate 70 and reaction plate 100 are replaced by a single bolt restraining plate 180 having a flange portion 182 adapted to engage strut flange peripheral edge 130 in the same manner as flange 114 of reaction plate 100 for preventing lateral movement of plate 180 and having a main body portion 183 with a plurality of holes 184, 186 therein, adapted to receive bolt 120 therethrough for providing a different camber setting associated with each hole 184, 186, as shown in FIGS. 24 and 25.

In yet another embodiment, the cam plate and reaction plate are replaced by a plurality of plates 190, 200, 210, each having a strut flange periphery engaging flange portion 194, 204, 214 and each having a main body portion 192, 202, 212 with a single bolt 120 receiving hole 196, 206, 216 therein and in which each plate is adapted to provide a different camber setting by providing a different relative position of bolt 120 within an associated strut flange slot, e.g. 66 (shown in phantom). Plate 190 is illustrated in use in FIG. 27.

It is contemplated that the inventive concept herein described may be variously otherwise embodied and it is intended that the appended claims be construed to include alternative embodiments of the invention except insofar as limited by the prior art.

What is claimed is:

1. A camber adjustable, vehicle wheel suspension system comprising:
   a generally vertically extending strut assembly having an upper end attached to a vehicle frame assembly and having a pair of strut flanges positioned in parallel relationship with one another and projecting laterally outwardly from a lower end portion of the strut assembly;
   a wheel knuckle assembly mounted on the strut assembly and having a mounting portion positioned between the two strut flanges with a first bolt hole therein adapted to closely, axially slidingly receive a first bolt therein which is also laterally displaceably received in a pair of oppositely positioned, laterally extending slots in the two strut flanges and with a second bolt hole therein adapted to closely, axially slidingly receive a second bolt which also passes through a pair of coaxially aligned bolt holes in the strut flanges, the first and second holes in the wheel knuckle mounting portion being vertically spaced apart, the first and second bolt holes in the wheel knuckle mounting portion and the pair of slots and pair of holes in the strut flanges having axes positioned in transverse relationship with the axis of rotation of a wheel supported on the wheel knuckle assembly;
   cam plate means for stably holding said first bolt in a plurality of discrete, relatively laterally shifted positions within said slots; a different wheel camber position being provided by each of said discrete, relatively laterally shifted positions of said first bolt; said cam plate means comprising a discrete peripheral surface portion associated with each of said plurality of different wheel camber positions; said cam plate means being mounted in freely rotatable radially nondisplaceable relationship relative said first bolt central longitudinal axis;
   cam engaging means stationarily mounted on one of said strut flanges for selectively engaging different ones of said discrete peripheral surface portions of said cam plate means for preventing slipping rotation of said cam plate means about said first bolt central longitudinal axis and for holding said cam plate means at a fixed lateral location relative said strut flange slots, which is associated with the selected one of said cam means peripheral surface portions engaged by cam engaging means;
   said cam engaging means comprising a reaction plate which is adapted to be secured to said one of said strut flanges by said first bolt; said reaction plate comprising a cam engaging portion adapted to engage said cam plate means and further comprising a lateral stabilizing means for preventing relative lateral movement of said reaction plate relative said laterally extending slot in said strut flange.

2. The invention of claim 1, said cam engaging portion comprising a cam engaging surface having a configuration adapted to receive said discrete peripheral surface portions of said cam means in abutting relationship therewith.

3. The invention of claim 2, said lateral stabilizing means comprising flange means adapted to engage a peripheral portion of one of said strut flanges.

4. The invention of claim 2, said lateral stabilizing means comprising means for interferingly engaging an outwardly projecting band portion integrally formed with said strut flanges and wrapped about an associated strut.

5. The invention of claim 1, said lateral stabilizing means comprising flange means projecting into said strut flange slot means.

* * * * *